United States Patent
Song et al.

(10) Patent No.: US 8,249,070 B2
(45) Date of Patent: Aug. 21, 2012

(54) METHODS AND APPARATUSES FOR PERFORMING SCENE ADAPTIVE RATE CONTROL

(75) Inventors: Xudong Song, Fremont, CA (US); Peter Xiao, Fremont, CA (US); Lei Zhu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 11/323,285

(22) Filed: Dec. 29, 2005

(65) Prior Publication Data

US 2007/0153692 A1 Jul. 5, 2007

(51) Int. Cl.
*H04L 12/28* (2006.01)
(52) U.S. Cl. .................... 370/391; 370/395.64
(58) Field of Classification Search .................. 370/230, 370/391, 395.64
See application file for complete search history.

(56) References Cited

U.S. PATENT DOCUMENTS

| | | | |
|---|---|---|---|
| 5,592,226 A * | 1/1997 | Lee et al. ................ | 375/240.14 |
| 5,754,231 A | 5/1998 | Odaka et al. | |
| 6,091,777 A * | 7/2000 | Guetz et al. ............. | 375/240.11 |
| 6,141,380 A * | 10/2000 | Krishnamurthy et al. ....................... | 375/240.02 |
| 7,254,176 B2 | 8/2007 | Chang et al. | |
| 7,319,480 B2 * | 1/2008 | Akiyama et al. .......... | 348/220.1 |
| 2003/0012560 A1 * | 1/2003 | Mori et al. ................ | 386/109 |
| 2003/0058224 A1 * | 3/2003 | Ushimaru .................. | 345/169 |
| 2003/0169933 A1 * | 9/2003 | Song et al. ................ | 382/239 |
| 2004/0037357 A1 * | 2/2004 | Bagni et al. ............. | 375/240.15 |
| 2005/0188407 A1 * | 8/2005 | van Beek et al. .......... | 725/81 |
| 2005/0201469 A1 * | 9/2005 | Sievers et al. .......... | 375/240.24 |
| 2005/0259978 A1 * | 11/2005 | Naitoh ...................... | 386/125 |

* cited by examiner

*Primary Examiner* — Sai-Ming Chan

(57) ABSTRACT

In one embodiment, the methods and apparatuses detect a network bandwidth; detect a sequence of frames; determine a motion based on the sequence of frames; set a target bit rate for the sequence of frames based on the network bandwidth; and set a frame rate for the sequence of frames based on the motion of the sequence of frames, wherein the target bit rate and the frame rate are utilized to process the sequence of frames.

22 Claims, 4 Drawing Sheets

METHODS AND APPARATUSES FOR PERFORMING SCENE ADAPTIVE RATE CONTROL

FIELD OF INVENTION

The present invention relates generally to performing rate control and, more particularly, performing scene adaptive rate control.

BACKGROUND

Different systems are utilized to increase efficiencies in transmitting information representing a scene from an originating device to a target device. In some instances, information representing the scene is utilized on the target device. Often times attempts at conserving bandwidth between the originating device and the target device is desirable.

SUMMARY

In one embodiment, the methods and apparatuses detect a network bandwidth; detect a sequence of frames; determine a motion based on the sequence of frames; set a target bit rate for the sequence of frames based on the network bandwidth; and set a frame rate for the sequence of frames based on the motion of the sequence of frames, wherein the target bit rate and the frame rate are utilized to process the sequence of frames.

BRIEF DESCRIPTION OF THE DRAWINGS

The accompanying drawings, which are incorporated in and constitute a part of this specification, illustrate and explain one embodiment of the methods and apparatuses for performing scene adaptive rate control. In the drawings.

DETAILED DESCRIPTION

The following detailed description of the methods and apparatuses for performing scene adaptive rate control refers to the accompanying drawings. The detailed description is not intended to limit the methods and apparatuses for performing scene adaptive rate control. Instead, the scope of the methods and apparatuses for performing scene adaptive rate control is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
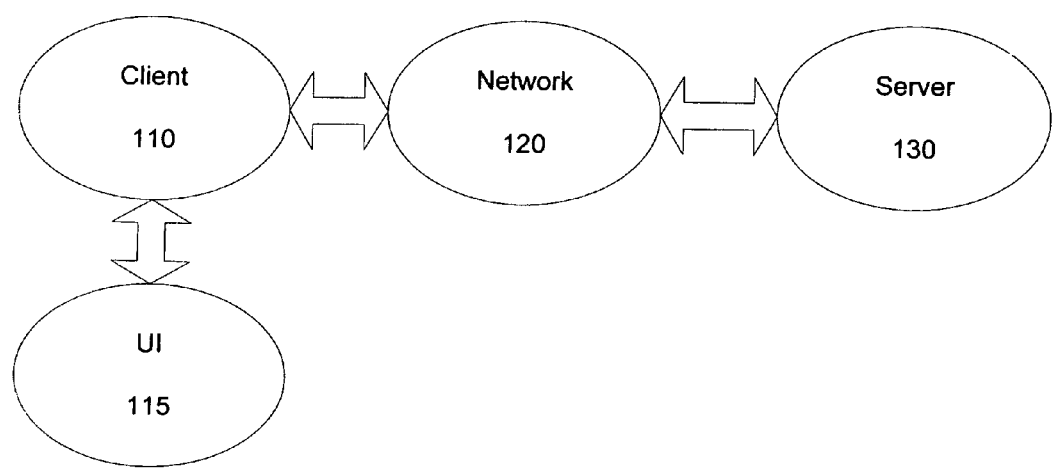
FIG. 1 is a diagram illustrating an environment within which the methods and apparatuses for performing scene adaptive rate control are implemented.

FIG. 1 is a diagram illustrating an environment within which the methods and apparatuses for performing scene adaptive rate control are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of performing scene adaptive rate control below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
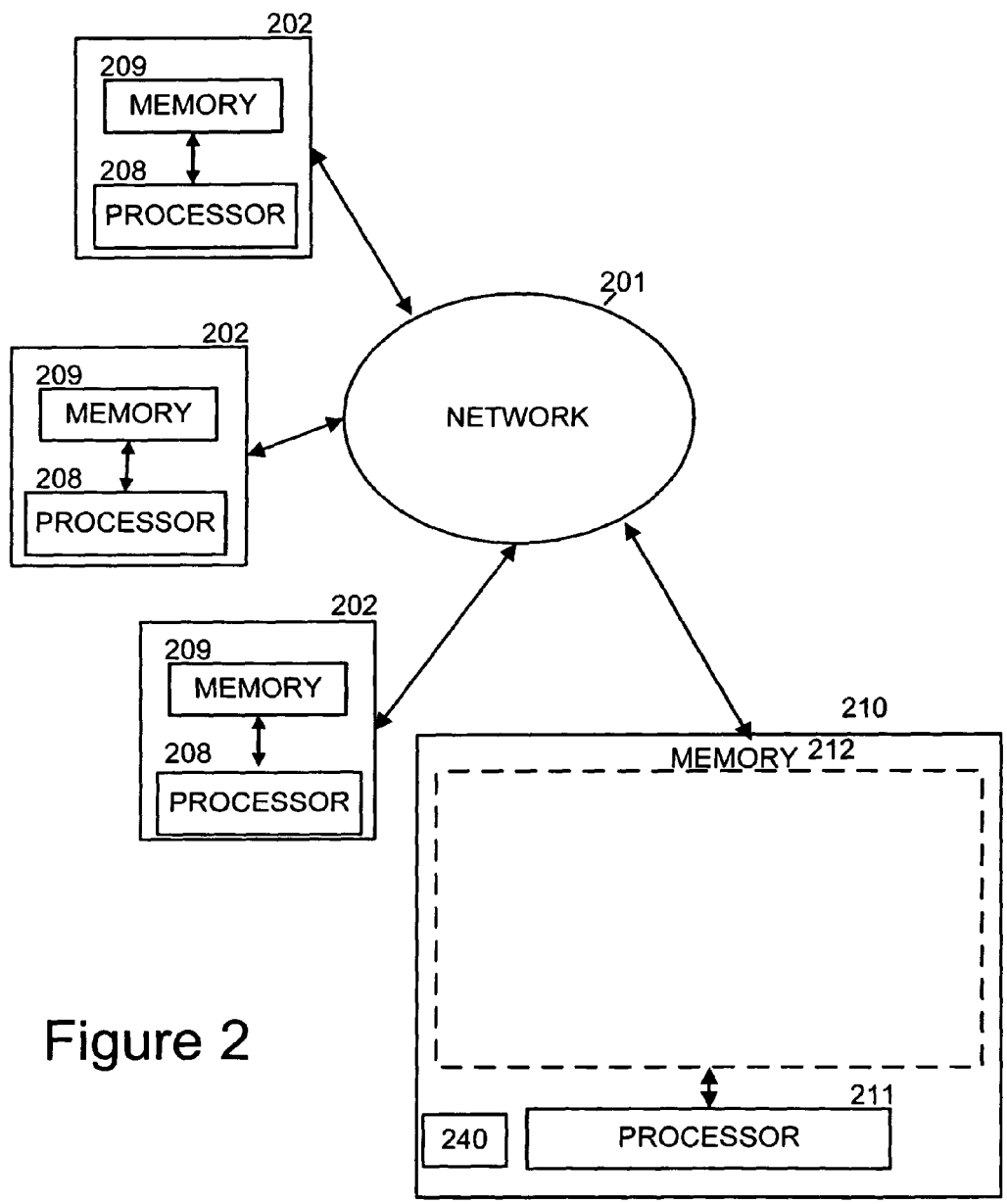
FIG. 2 is a simplified block diagram illustrating one embodiment in which the methods and apparatuses for performing scene adaptive rate control are implemented.

FIG. 2 is a simplified diagram illustrating an exemplary architecture in which the methods and apparatuses for performing scene adaptive rate control are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on performing scene adaptive rate control using embodiments described below.

Figure 3:
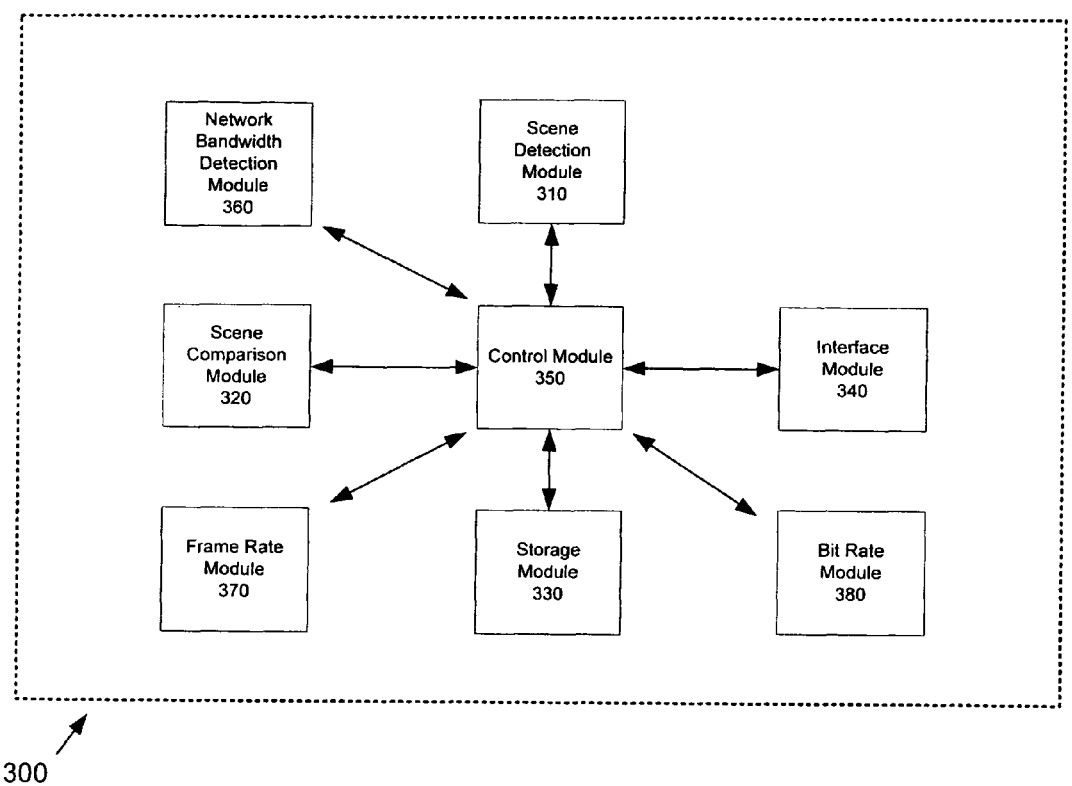
FIG. 3 is a simplified block diagram illustrating a system, consistent with one embodiment of the methods and apparatuses for performing scene adaptive rate control.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a scene detection module 310, a scene comparison module 320, a storage module 330, an interface module 340, a control module 350, a network detection module 360, a frame rate module 370, and a bit rate module 380.

In one embodiment, the control module 350 communicates with the scene detection module 310, the scene comparison module 320, the storage module 330, the interface module 340, the network detection module 360, the frame rate module 370, and the bit rate module 380. In one embodiment, the control module 350 coordinates tasks, requests, and communications between the scene detection module 310, the scene comparison module 320, the storage module 330, the interface module 340, the network detection module 360, the frame rate module 370, and the bit rate module 380.

In one embodiment, the scene detection module 310 detects a scene that represents a visual representation. In one embodiment, the scene detection module 310 detects a stream of scenes that collectively represent a video stream.

In one embodiment, the scene comparison module 320 compares the content of two scenes. In one embodiment, the compared scenes are located adjacent to each other. In another embodiment, the compared scenes are not adjacent to each other.

In one embodiment, the storage module 330 stores a bit rate and frame rate associated with a scene. In another embodiment, the storage module 330 also temporarily stores the scenes.

In one embodiment, the interface module 340 detects scenes and network bandwidth from outside devices. Further, the interface module 340 also returns a bit rate and a frame rate for use by other devices.

In one embodiment, the network bandwidth detection module 360 detects the bandwidth of the network associated with the system 300. In one embodiment, the network bandwidth detection module detects the network bandwidth through the interface module 340.

In one embodiment, the frame rate module 370 sets the frame rate based on the comparison between more than one scene.

In one embodiment, the bit rate module 380 sets the target bit rate based on the network bandwidth.

The system 300 in FIG. 3 is shown for exemplary purposes and is merely one embodiment of the methods and apparatuses for performing scene adaptive rate control. Additional modules may be added to the system 300 without departing from the scope of the methods and apparatuses for performing scene adaptive rate control. Similarly, modules may be combined or deleted without departing from the scope of the methods and apparatuses for performing scene adaptive rate control.

Figure 4:
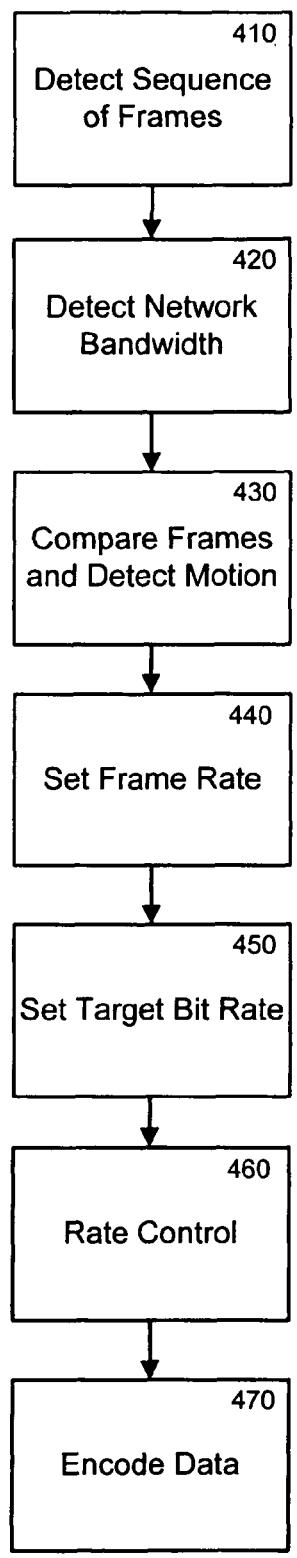
FIG. 4 is a flow diagram consistent with one embodiment of the methods and apparatuses for performing scene adaptive rate control.

The flow diagram as depicted in FIG. 4 is one embodiment of the methods and apparatuses for performing scene adaptive rate control. The blocks within the flow diagram can be performed in a different sequence without departing from the spirit of the methods and apparatuses for performing scene adaptive rate control. Further, blocks can be deleted, added, or combined without departing from the spirit of the methods and apparatuses for performing scene adaptive rate control.

The flow diagram in FIG. 4 illustrates setting a frame rate and setting a target bit rate according to one embodiment of the invention.

In Block 410, a sequence of frames is detected. In one embodiment, the sequence of frames represents a video segment. In one embodiment, the detection of the sequence of frames is performed by the scene detection module 310 through the interface module 340.

In Block 420, the network bandwidth is detected. In one embodiment, the network bandwidth reflects the capacity of the network 120 to exchange information. In another embodiment, the network bandwidth also reflects the capacity of the system 300 to process the information. In one embodiment, the detection of the network bandwidth is performed by the network bandwidth detection module 360 through the interface module 340.

In Block 430, a current frame is compared against a prior frame and motion is detected based on this comparison. In one embodiment, the comparison of the frames is performed within the scene comparison module 320. For example, the content of the current frame is compared with the content of the prior frame. The difference between the content of the current frame and the prior frame indicates the change between the current frame relative to the prior frame and indicates motion of the current frame.

In Block 440, a frame rate associated with the sequence of frames is set. In one embodiment, the frame rate is set by the frame rate module 370. In one embodiment, the frame rate is determined based on the motion that is detected between the current frame and the previous frame in the Block 430.

For example, as the difference between the current frame and the previous frame is reduced which reflects a smaller amount of motion between the two frames, the frame rate is adjusted and set lower. In one embodiment, since the motion has decreased, the frame rate can also be decreased thus saving on bandwidth while preserving quality of the frame sequence on both playback and recording. Likewise, as the change and motion between the previous frame and the current frame is increased, the frame rate also increases to accommodate playback and recording with minimized loss of resolution.

In Block 450, a target bit rate associated with the sequence of frames is set. In one embodiment, the target bit rate is set by the bit rate module 380. In one embodiment, the target bit rate is determined based on the network bandwidth that is detected in the Block 430.

For example, as the network bandwidth increases, the target bit rate can be raised to increase quality of the recording and playback of the sequence of frames. Likewise, when the network bandwidth decreases, the target bit rate can be decreased to ensure recording, playback, and delivery of the sequence of frames.

In Block 460, the bit rate is controlled based on the target bit rate set within the Block 450. In one embodiment, the quantization parameter is determined based on the target bit rate.

In Block 470, the data is encoded based on the quantization parameter. In one embodiment, the data is audio data. In another embodiment, the data is video data.

In use, the methods and apparatuses for performing scene adaptive rate control have many different applications. The following example is meant to illustrate one such application and is merely offered to show one embodiment. In this example, the input video sequence is divided into group of pictures (GOP). According to H.264 baseline profile, each GOP contains one I (intra-frame coded) picture and a number of P (forward predictive coded) pictures. The letters "i" and "j" are utlized to represent the index of GOP and $j^{th}$ picture in the $i^{th}$ GOP, respectively.

In one embodiment, the system 300 encodes the first I picture of the first GOP using an initial quantization parameter (QP). In one embodiment, an initial QP of first GOP is estimated from the demanded bits per pixel. The first P picture of the first GOP is encoded using (QP-2). In a subsequent GOP, the first I picture is encoded using QP from last P picture from the prior GOP.

When the $j^{th}$ picture in the $i^{th}$ GOP is encoded, the remaining bits (RB) for encoding the subsequent P frames can be calculated as follows:

$$RB_i(j)=RB_i(j-1)-AB_i(j-1) \quad j=2,3,\ldots,N_i \quad \text{Equation 1}$$

Where $AB_i(j-1)$ represents the actual bits (AB) generated in the $(j-1)^{th}$ picture. For the first picture in a GOP, the remaining bits for encoding the rest picture in this GOP are calculated as follows:

$$RB_i(1) = \frac{RS}{FR} \times N_i - VB_i(1) \quad \text{Equation 2}$$

Where RS represents bit rate for the sequence. $N_i$ is the total number of pictures in the $i^{th}$ GOP. The fullness of virtual buffer (VB) after encoding each picture is updated as follows:

$$VB_i(j) = VB_i(j-1) + AB_i(j-1) - \frac{RS}{FR} \quad \text{Equation 3}$$
$$j = 2, 3, \ldots, N_i$$

Where $VB_i(1)$ is equal to $VB_{i-1}(N_{i-1})$. $VB_1(1)$ is equal to 0.

In one embodiment, the target bits (TB) for each frame are allocated for the $j^{th}$ p picture in the $i^{th}$ GOP are determined based on the number of remaining bits, the target buffer level (TBL), the frame rate, the available network bandwidth, the actual buffer fullness, and/or the actual bits used for the previous P frame. The target bits are computed as follows:

$$TB_i(j) = 0.475 \times \frac{RB_i(j)}{N_{r,p}} + \quad \text{Equation 4}$$
$$0.475 \times \left( \frac{RS}{FR} + 0.5 \times (TBL_i(j) - VB_i(j)) \right) +$$
$$0.05 \times AB_i(j-1)$$

Where $N_{r,p}$ is the number of the remaining P pictures. $TBL_i(j)$ is updated as follows:

$$TBL_i(j) = TBL_i(j-1) - \frac{VB_i(2)}{N_{i,p}-1} \quad \text{Equation 5}$$

Where $N_{i,p}$ represents the total number of P picture in the $i^{th}$ GOP.

In one embodiment, $TB_i(j)$ is bounded by lower bound (LB) and upper bound (UP).

$$TB_i(j)=\max\{LB_i(j-1),TB_i(j)\} \quad \text{Equation 6}$$

$$TB_i(j)=\min\{UP_i(j-1),TB_i(j)\} \quad \text{Equation 7}$$

$LB_i(j)$ is computed as follows:

$$LB_i(j) = LB_i(j-1) + \frac{RS}{FR} - AB_i(j) \quad \text{Equation 8}$$
$$j = 2, 3, \ldots, N_i$$

$$LB_i(1) = RB_{i-1}(N_{i-1}) + \frac{RS}{FR} \quad \text{Equation 9}$$

$UP_i(j)$ is computed as follows:

$$UP_i(j) = UP_i(j-1) + \frac{RS}{FR} - AB_i(j) \quad \text{Equation 10}$$
$$j = 2, 3, \ldots, N_i$$

$$UP_i(1) = UP_{i-1}(N_{i-1}) + 2 \times RS \quad \text{Equation 11}$$

The quantization parameter is calculated as follows:

$$QP_i(j) = \alpha \times \frac{X_i(j)}{TB_i(j)} \quad \text{Equation 12}$$

Where $X_i(j)$ is updated as follows:

$$X_i(j)=QP_i(j-1) \times AB_i(j-1) \quad \text{Equation 13}$$

Where $\alpha$ is a factor that allows us to maintain at least reasonable video quality for a collaboration session.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   detecting a network bandwidth;
   detecting a sequence of frames by an electronic processor of an electronic device;
   determining a motion based on the sequence of frames by the electronic processor;
   setting a target bit rate for the sequence of frames based on the network bandwidth;
   setting a frame rate for the sequence of frames based on the motion of the sequence of frames;
   allocating, by the electronic processor, a number of target bits for each frame based, at least in part, on the target bit rate for the sequence of frames, the frame rate for the sequence of frames, a fullness of a virtual buffer used by the electronic processor in processing the sequence of frames, bits used for a previous frame of the sequence of frames, and a ratio of the number of remaining bits available for encoding the remaining frames in the sequence of frames to the number of remaining frames in the sequence of frames; and
   processing the sequence of frames.

2. The method according to claim 1 wherein the network bandwidth is a capacity to exchange information between multiple devices.

3. The method according to claim 1 wherein the network bandwidth is a capacity to exchange information within a single device.

4. The method according to claim 1 further comprising increasing the target hit rate for the sequence of frames based on an increase in the network bandwidth.

5. The method according to claim 1 further comprising decreasing the target bit rate for the sequence of frames based on a decrease in the network bandwidth.

6. The method according to claim 1 further comprising storing a motion threshold wherein the motion threshold determines the frame rate.

7. The method according to claim 6 further comprising increasing the frame rate based on the motion above the motion threshold.

8. The method according to claim 6 further comprising decreasing the frame rate based on the motion below the motion threshold.

9. The method according to claim 1 further comprising processing the sequence of frames with the frame rate.

10. The method according to claim 1 further comprising processing the sequence of frames with the target bit rate for the sequence of frames.

11. The method according to claim 1 wherein the sequence of frames comprises a video segment.

12. A system, comprising:
a processor; and
a memory configured to store a plurality of software modules executable by the processor, the software modules including
a scene comparison module configured to detect a motion based on comparing a current frame to a prior frame of a sequence of frames,
a network bandwidth detection module configured to detect a network bandwidth,
a frame rate module configured to set a frame rate for the current frame based on the motion detected within the scene comparison module, and
a target bit rate module configured to determine a target bit rate for the sequence of frames based on the network bandwidth and set a target bit rate for the current frame based, at least in part, on the target bit rate for the sequence of frames, the frame rate for the sequence of frames, a fullness of a virtual buffer used in processing the sequence of frames, bits used for a previous frame of the sequence of frames, and a ratio of the number of remaining bits available for encoding the remaining frames in the sequence of frames to the number of remaining frames in the sequence of frames.

13. The system according to claim 12 further comprising a scene detection module configured to detect the sequence of frames.

14. The system according to claim 12 further comprising a storage module configured to store the current frame and the prior frame.

15. The system according to claim 12 further comprising a storage module configured to store the frame rate and the target bit rate for the sequence of frames.

16. A system comprising:
a processor;
means for determining a motion based on a sequence of frames;
means for setting a target bit rate for the sequence of frames based on a network bandwidth;
means for setting a frame rate for the sequence of frames based on the motion of the sequence of frames;
means for allocating a number of target bits for each frame based, at least in part, on the target bit rate for the sequence of frames, the frame rate for the sequence of frames, a fullness of a virtual buffer in processing the sequence of frames, bits used for a previous frame of the sequence of frames, and a ratio of a number of remaining bits available for encoding the remaining frames in the sequence of frames to the number of remaining frames in the sequence of frames; and
means for processing the sequence of frames.

17. The method according to claim 1, wherein determining the motion of the sequence of frames comprises:
comparing a current frame against a prior frame to determine the motion.

18. The system according to 12 wherein the scene comparison module is further figured to compare the current frame against a prior frame to detect the motion.

19. The method according to claim 1, wherein the number of target bits for each frame is further allocated based, at least in part, on a target buffer level of the virtual buffer used by the electronic processor in processing the sequence of frames.

20. The system according to claim 12 wherein the target bit rate module is further configured to allocate the number of target bits for each frame based, at least in part, on a target buffer level of the virtual buffer used in processing the sequence of frames.

21. The method according to claim 1 wherein the number of target bits for each frame is further allocated based, at least in part, on a ratio of the target bit rate for the sequence of frames to the frame rate for the sequence of frames.

22. The method according to claim 1 wherein the number of target bits for each frame is further allocated based upon a sum of a first weighted value that depends upon a ratio of the number of remaining bits available for encoding the remaining frames in the sequence of frames to the number of remaining frames in the sequence of frames, a second weighted value that depends upon a ratio of the target bit rate for the sequence of frames to the frame rate for the sequence of frames, and a third weighted value that depends upon the bits used for the previous frame of the sequence of frames.

* * * * *